US006301643B1

(12) United States Patent
Crockett et al.

(10) Patent No.: US 6,301,643 B1
(45) Date of Patent: Oct. 9, 2001

(54) MULTI-ENVIRONMENT DATA CONSISTENCY

(75) Inventors: Robert Nelson Crockett; Ronald Maynard Kern; Gregory Edward McBride, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,413

(22) Filed: Sep. 3, 1998

(51) Int. Cl.[7] .......................... G06F 12/00; H03K 19/003; H04B 1/74; H05K 15/00

(52) U.S. Cl. ........................... 711/162; 711/154; 711/111; 711/112; 714/13; 714/6; 714/20

(58) Field of Search .................................... 711/162, 161, 711/111, 112, 113, 114, 154; 714/2, 5, 6, 13, 15, 20

(56) References Cited

U.S. PATENT DOCUMENTS 4,979,108 12/1990 Crabbe, Jr. .
5,197,148 3/1993 Blount et al. .
5,263,154 * 11/1993 Eastridge et al. .................... 395/575
5,446,871 8/1995 Shcomler et al. .
5,504,861 4/1996 Crockett et al. .
5,555,371 9/1996 Duyanovich et al. .
5,574,950 11/1996 Hathorn et al. .
5,577,222 11/1996 Micka et al. .
5,581,753 12/1996 Terry et al. .
5,583,986 12/1996 Park et al. .
5,590,277 12/1996 Fuchs et al. .
5,592,618 1/1997 Micka et al. .
5,594,900 1/1997 Cohn et al. .
5,615,329 3/1997 Kern et al. .
5,619,644 * 4/1997 Crockett et al. ................ 395/183.21
5,627,961 5/1997 Sharman .
5,640,561 6/1997 Satoh et al. .
5,682,513 10/1997 Candelaria et al. .
5,692,155 11/1997 Iskiyan et al. .
5,720,029 2/1998 Kern et al. .
5,734,818 3/1998 Kern et al. .
5,742,792 * 4/1998 Yanai ................................... 395/489
5,889,935 * 3/1999 Ofek ......................................... 714/6
6,052,758 * 4/2000 Crockett et al. ..................... 711/113
6,052,797 * 4/2000 Ofek ......................................... 714/6
6,098,078 * 8/2000 Gehani et al. ....................... 707/203
6,148,383 * 11/2000 Micka et al. ......................... 711/162
6,157,991 * 12/2000 Arnon ................................. 711/161
6,163,856 * 12/2000 Dion et al. ............................. 714/4

FOREIGN PATENT DOCUMENTS

98/20419 * 5/1998 (WO) .

OTHER PUBLICATIONS

Performance Improvements Through the Use of Multi–Channel Command Word, IBM Technical Disclosure Bulletin, vol. 38, No. 09, Sep. 1995.
Remote Copy Link–Level Reconfiguration Without Affecting Copy Pairs, IBM Technical Disclosure Bulletin, vol. 38, No. 01, Jan. 1995.
Integration of Persistent Memory Data Into Real–Time Asynchronous Direct Access Storage Device Remote Copy, IBM Technical Disclosure Bulletin, vol. 39, No. 10, Oct. 1995.
DFSMS/MVS Verson 1, Remote Copy, Administrator's Guide and Reference, IBM BookManager, Document No. SC35–0169–2, File No. S390–34 (selected chapters).
Efficient Management of Remote Disk Subsystem Data Duplexing, IBM Technical Disclosure Bulletin, vol. 29, No. 01, Jan. 1996.

* cited by examiner

*Primary Examiner*—Do Hyun Yoo
*Assistant Examiner*—Kimberly McLean
(74) *Attorney, Agent, or Firm*—David W. Victor; Konrad Raynes & Victor LLP

(57) ABSTRACT

Disclosed is a system for maintaining consistency of data across storage devices. A cut-off time value is provided to the system. The system then obtains information on data writes to a first storage device, including information on time stamp values associated with the data writes indicating an order of the data writes to the first storage device. At least one group of data writes having time stamp values earlier in time than the cut-off time value is then formed. The system then transfers the data writes in the groups to a second storage device for storage therein.

15 Claims, 2 Drawing Sheets

MULTI-ENVIRONMENT DATA CONSISTENCY

BACKGROUND OF THE INVENTION

1. Field of the Invention

The present invention relates to a method and system for insuring that data is stored in a consistent and sequential manner.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM of XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the XRC environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volumes in the volume pair in the same order as they were done on the primary volume. In the XRC and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are, assigned to IBM, the assignee of the subject patent application, and which are incorporated herein by reference in their entirety.

Consistency groups are formed under the following assumptions:

(A) application writes that are independent can be performed in any order;

(B) application writes that are dependent must be performed in time stamp order;

(C) a second write of a first and second dependent write pair will always be either in the same record set consistency group as a first write with a later time stamp or in a subsequent record consistency group.

In prior art systems, to generate reports for the current data, the user would have to take the application system off-line and stop updating data to the primary volumes. The user could then run reports on the current volumes in the secondary DASD. To insure the consistency of the report at a specific time, the user would break the volume pair and not allow any updates or writes to the primary or secondary volume of those volumes pairs being tested. This allows the user to insure that all writes are consistent as of a specified time. However, with such a system, the primary volume cannot receive updates from the application program until the reports on the secondary volumes are completed and the secondary volumes are brought back on-line to shadow writes to the primary volumes.

SUMMARY OF THE PREFERRED EMBODIMENTS

To overcome the limitations in the prior art described above, the present invention discloses a system for maintaining consistency of data across storage devices. A cut-off time value is provided to the system. The system then obtains information on data writes to a first storage device, including information on time stamp values associated with the data writes indicating an order of the data writes to the first storage device. At least one group of data writes having time stamp values earlier in time than the cut-off time value is then formed. The system then transfers the data writes in the groups to a second storage device for storage therein.

In further embodiments, the system includes information on at least one volume pair to which the cut-off time applies. A volume pair comprises a volume in the second storage device and a corresponding volume in the first storage device. The volume in the second storage device includes a copy of data in the corresponding volume in the first storage device, wherein the groups only include data writes to the provided volume pairs.

In yet further embodiments, information is obtained and data groups are formed multiple times until the time stamp value of the data writes is determined to be at or later in time than the cut-off time value. If the process of obtaining information reveals that there were no data writes to the first storage device since the previous instance of obtaining information, then a time stamp value is calculated by adding a predetermined time value to the time stamp value of a previously formed group of data writes.

Preferred embodiments of the present invention provide a system for insuring the consistency of data writes to a first storage device that are shadowed in a secondary device at a user specified cut-off time. The preferred embodiments allow the user to specify a cut-off time at which the secondary storage will be current, i.e., include all data writes having time stamp values earlier in time than the user specified cut-off time. After the secondary storage is consistent as of a user specified cut-off time, the user may run reports on the data knowing that the data in the secondary storage is current and does not include data writes having time stamp values subsequent to the user specified cut-off time. Moreover, with preferred embodiments, data writes can still be made to the volumes in the first primary device even though such data writes are not being provided, for the time being, to the secondary storage device.

Preferred embodiments further provide a system for calculating a subsequent time stamp value in the event that there were no data writes since the last time information on data writes was obtained. The system may then increment the time stamp value to the user specified cut-off time even if no data writes were made to the primary storage device. This allows the system to keep track of the time stamp values.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
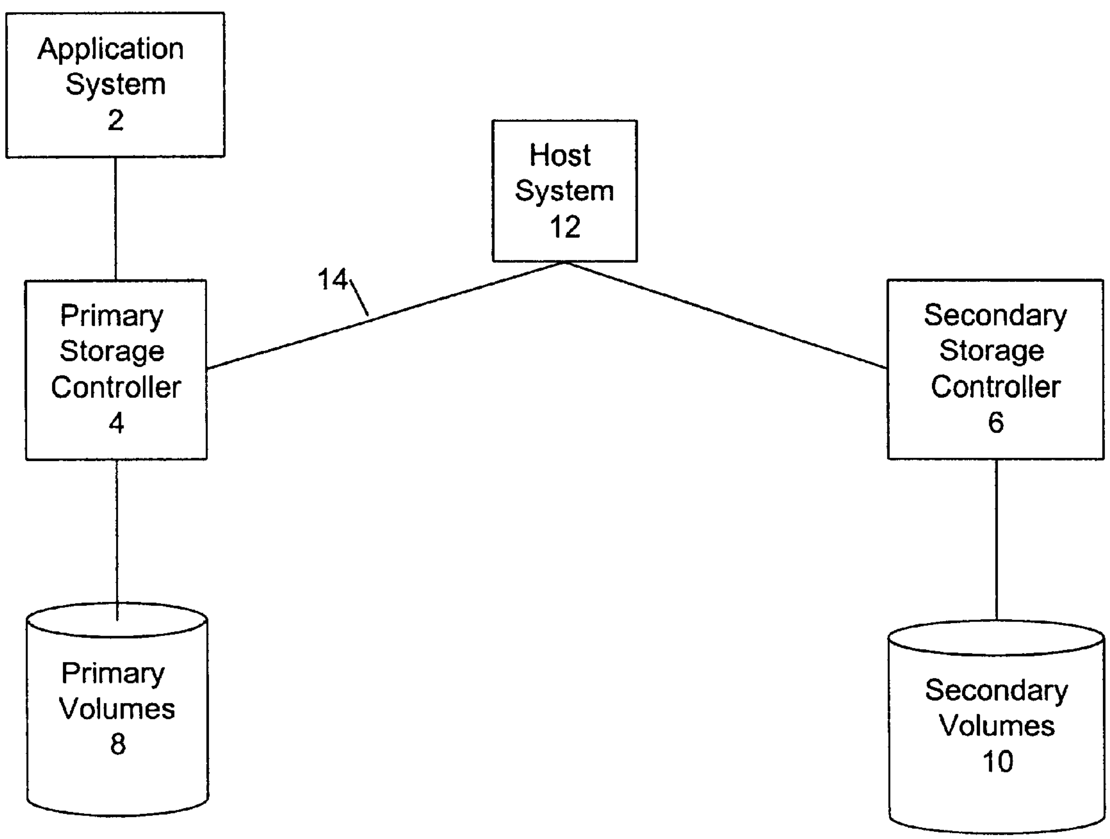
FIG. 1 is a block diagram illustrating a software and hardware environment in which preferred embodiments of the present invention are implemented.

FIG. 1 illustrates the hardware and software environment in which preferred embodiments of the present invention are implemented. Preferred embodiments include an application system 2, a primary 4 and secondary 6 storage controllers, a primary 8 and secondary 10 direct access storage devices (DASD), and a host system 12. Communication lines 14 provide communication between the host system 12 and the primary 4 and secondary 6 storage controllers.

Storage is maintained at two sites, a primary site and a secondary site. The primary site may include the application system 2, the primary storage controller 4, and the primary DASD 8. The secondary site may include the secondary storage controller 6 and the secondary DASD 10. The host system 12 may be at the secondary or primary site, or an alternative geographical location. In certain embodiments, the primary and secondary sites could be separated by considerable distances, such as several miles.

At the primary site, the application system 2, such as a database program or any other application program, writes data to the primary DASD 8. In preferred embodiments, the application system 2 includes a sysplex timer to provide a time stamp to any data writes the application system 2 sends to the primary storage controller 4. A backup copy of certain volumes in the primary DASD 8 is maintained in the secondary DASD 10. Volumes in the primary DASD 8 being shadowed in the secondary DASD 10 are referred to as "volume pairs." The secondary DASD 10 may provide a shadow copy of the data for data recovery purposes.

The primary 4 and secondary 6 controllers control access to the primary 8 and secondary 10 DASDs, respectively. In the embodiment of FIG. 1, data is transferred from the primary DASD 8, to the primary controller 4, to the host system 12, then to the secondary DASD 10 via the secondary controller 6. In this preferred mode of data transfer, data is transferred between controllers 4, 6 through the host system 12 address space. The primary 4 and secondary 6 storage controllers may be any suitable storage subsystem controller known in the art, such as the IBM 3990 Model 6 storage controller. The host system 12 may be any suitable computer system known in the art, such as a mainframe, desktop, workstation, etc., including an operating system such as WINDOWS®V, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. The communication lines 14 may be comprised of any suitable network technology known in the art, such as LAN, WAN, SNA networks, TCP/IP, the Internet, etc. Alternatively, the communication line may be comprised of ESCON® technology. ESCON is a registered trademark of IBM.

In preferred embodiments, the host system 12 includes software to automatically read information on data writes to the primary DASD 8 by the application system 2 and transfer the data writes to the secondary DASD 10 for those volume pairs being shadowed at the secondary site. As mentioned, the host system 12 may include software including the functionality of data mover software included in storage management programs known in the art that manage the transfer of data between storage systems. Such data movement software is implemented in the IBM DFSMS software and XRC components implemented in the IBM MVS operating system. In addition to including data mover logic known in the art, the software in the host system 12 would further include additional program instructions and logic to perform the operations of the preferred embodiments of the present invention. The data mover software may be implemented within the operating system of the host systems 2, 4 or as separate, installed application programs. The host system 12 includes various memory areas, such as volatile and non-volatile memory areas, for storing data structures and logic used in implementing the preferred embodiments of the present invention.

Forming Consistency Groups According to User Specified Cut-Off Time

In preferred embodiments, the user enters a command including as parameters a target cut-off time and a set of volume pairs or session including a plurality of volume pairs. This command would cause the system to insure that the data is consistent for the volumes specified in the command at the user specified cut-off time. This means that for the volumes indicated in the command, all consistency groups with a consistency time at or earlier in time than the cut-off time are updated to the secondary volume. After insuring data consistency at this future cut-off time, the user could then suspend the consistent volume pairs and tests data and run various reports on the secondary volume pairs in the secondary DASD 10 knowing that the secondary DASD 10 would be consistent up until the cut-off time. The host system 12 maintains a journal record including control information necessary for forming consistency groups to control the transfer of data sets and volumes from the host system 12 to the secondary DASD 10.

Figure 2:
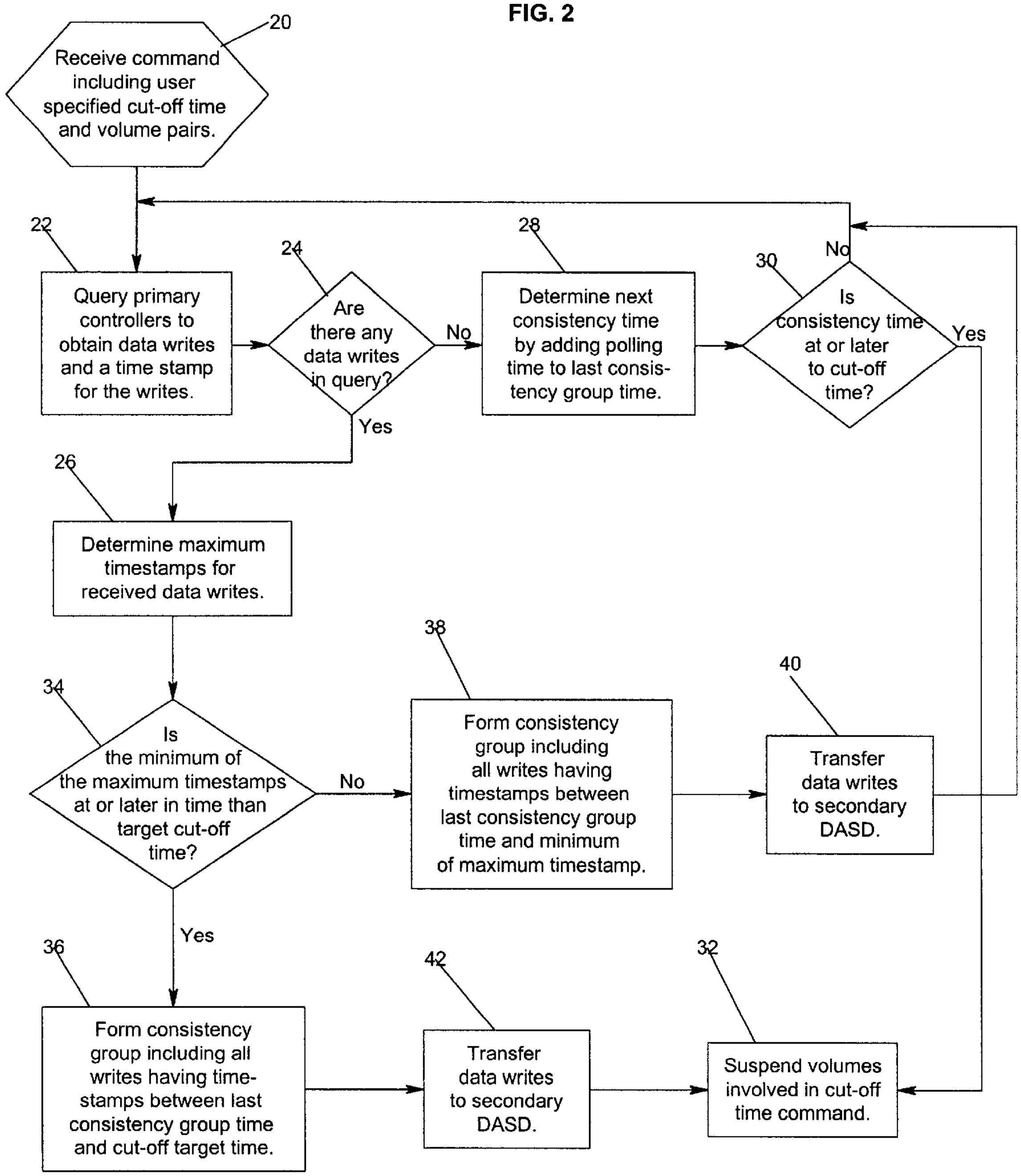
FIG. 2 illustrates a flowchart illustrating logic for sequentially transferring data in a logical order from a first storage device to a second storage device in accordance with preferred embodiments of the present invention.

FIG. 2 illustrates logic implemented as software and/or hardware logic in the host system 12 for insuring data consistency at a user specified cut-off time. Control begins at block 20 which represents a user entering a command at the host system 12 to insure data consistency at a user specified cut-off time. The data would be consistent for volume pairs specified by the user in the command. The user may also specify a command to perform at the cut-off time, such as suspending the specified volumes to prevent further data updates from being transferred from the primary 8 to secondary 10 DASDs or delete the volume pairs from the current session after the cut-off time.

Control then transfers to block 22 which represents the host system 12 querying the primary controllers 4 to obtain any data writes and metadata describing the data writes received by the primary controllers 4 from the application system 2, including the time stamp information, since the last consistency group was formed. In preferred embodiments, the primary storage controller 4 would independently and immediately sequentially transfer data writes to the primary DASD 8. The time stamp is a time or value provided by the application system 2 specifying a temporal order of data writes. The time stamp value may be a time value or an integer value that is incremented or otherwise modified to reflect the passage of time. Control transfers to block 24 which represents the host system 12 determining whether the query yielded new data writes to the primary controllers subsequent to the formation of the latest consistency group. If so, control transfers to block 26; otherwise, control transfers to block 28. If, at block 24, the query did not locate any recent data writes, then at block 28, the host system 12 calculates a subsequent consistency time by adding the polling time, i.e., time between which the host system 12 queries the primary storage controllers 4 for recent data writes, to the last consistency time for the last consistency group formed.

Control then transfers to block 30 which represents the host system 12 determining whether the calculated consistency time is at or later in time than the cut-off time. If so, then control transfers to block 32 which represents the host system 12 suspending the volume pairs indicated in the command from being updated. The user may then run various reports or perform tests on the volumes in the secondary DASD 10 subject to the suspend command. Because activity is suspended to the pairs, the reports are generated under the assumption that data is consistent as of the user specified cut-off target time. In alternative embodiments, the command concerning the consistent pairs may be a delete command deleting volume pairs from the session.

The steps from blocks 24 through 32 allow the host system 12 to generate consistency time stamps to reach the cut-off time when there are no data writes from the application system 2. By generating further consistency times in the absence of data writes, the host system 12 can determine when the target cut-off time is reached and then perform the user specified command, e.g., suspend or delete volume pairs, with the data being consistent in the secondary DASD 10 as of the user specified target cut-off time.

If, at block 24, there were data writes indicated in the query as of the last consistency time, then control transfers to block 26 which represents the host system 12 determining the maximum time stamps of data writes for all primary controllers 12 in the system, i.e., the most recent time stamp for each primary controller 12. Typically, the maximum (most recent) time stamp for a primary storage controller is the last update or data write received by the storage controller. There may be one or more primary controllers receiving data writes from the application system 2. If there is only one primary controller 4, then there would only be one maximum time stamp for all data writes to such primary storage controller 4. As discussed, in preferred embodiments, the host system 12 makes such determinations on the data after receiving the writes from the primary storage controllers 4. Control then transfers to block 34 which is a decision block representing the host system 12 determining the minimum (oldest) of all the maximum time stamps and then determining whether the minimum of the maximum time stamps is at or later in time than the user specified target cut-off time. If so, control transfers to block 36; otherwise, control transfers to block 38. If the minimum of the maximum time stamps is later in time than the user specified cut-off time, then this indicates that there are data writes subsequent to the user specified cut-off time for the secondary DASD 10.

If the minimum of the maximum of the time stamps is earlier in time than the target cut-off time, then, at block 38, the host system 12 forms a consistency group including all data writes having time stamps between the last consistency group time and the minimum (oldest) of the maximum (most recent) of the time stamps. Control then transfers to block 40 which represents the host system 12 transferring the data writes to the secondary DASD 10 via the secondary storage controller 6. The secondary storage controller 6 applies the data writes to the secondary DASD in sequential order. From block 40, control transfers back to block 22 et seq. to query the primary controllers to obtain information on any recent data writes and form the necessary consistency groups.

If the minimum of the maximum time stamps is at or later in time than the target cut-off time, then control transfers to block 36 which represents the host system 12 forming a consistency group including all recent data writes from all primary storage controllers 4 having time stamps between the last consistency group consistency time and the target cut-off time. Any data writes time stamped after the target cut-off time are placed in the subsequent consistency group. Control then transfers to block 42 which represents the host system 12 transferring the data writes to the secondary DASD 10, via the secondary storage controller 6. The secondary storage controller 6 applies the data writes to the secondary DASD in sequential order. Control then transfers to block 32 which represents the host system 12 suspending activity for those volume pairs specified in the user command.

The user may then generate reports on the suspended volume pairs from the data maintained in the secondary DASD. With the preferred embodiments, the application system 2 can still write data to the primary DASD 8 even though the data is not being shadowed at the secondary DASD 10 during the time the volume pairs are suspended or rendered inactive. This allows a user to generate reports on data in the secondary DASD 10 wherein the data is consistent across a user specified target cut-off time without having to take the application system 2 off-line. Thus, with preferred embodiments, only updates to the secondary DASD 10 are suspended for the specific volume pairs involved, and the entire system does not have to be taken off-line to generate the various reports.

The preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Conclusion

This concludes the description of the preferred embodiments of the invention. The following describes some alternative embodiments for accomplishing the present invention.

Preferred embodiments were described with respect to a time stamp generated by a sysplex timer in the application program. In alternative embodiments, the time stamp may be any counter value indicating the sequential order of data writes.

Preferred embodiments were described with respect to a system in which a host system controlled the movement of data between a primary 8 and secondary 10 DASDs. However, in alternative embodiments some or all of the logic described as implemented in the host system 12 may be implemented in the primary 4 and/or secondary 6 controllers. In yet further embodiments, the functions and operations described with respect to the host system 12 may be performed across multiple processing units and/or host systems.

Preferred embodiments were described with respect to data writes to one or more primary storage controllers 4 and a single secondary storage controller 6. In alternative embodiments, there may be a plurality of secondary storage controllers 6 and any number of primary storage controller(s) 4.

The logic concerning the formation of consistency groups and sequentially transferring data from the primary 8 to the secondary 10 DASDs was described as being implemented in software within the host system 12. This logic may be part of the operating system of the host system 12 or an application program such as the IBM DFSMS storage management software. In yet further embodiments, this logic may be maintained in storage areas managed by the controllers 4, 6 or in a read only memory or other hardwired type of device.

In summary, preferred embodiments in accordance with the present invention disclose a system for maintaining consistency of data across storage devices. A cut-off time value is provided to the system. The system then obtains information on data writes to a first storage device, including information on time stamp values associated with the data writes indicating an order of the data writes to the first storage device. At least one group of data writes having time stamp values earlier in time than the cut-off time value is then formed. The system then transfers the data writes in the groups to a second storage device for storage therein.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining the consistency of data across storage devices, comprising:

receiving a user specified cut-off time value in a command to ensure that data is consistent as of the user specified cut-off time by receiving at least one user specified volume pair to which the user specified cut-off time applies, wherein a volume pair comprises a volume in a first storage device and a corresponding volume in a second storage device, wherein the volume in the second storage device includes a copy of data in the corresponding volume in the first storage device;

obtaining information on data writes to the first storage device, including information on time stamp values associated with the data writes indicating an order of the data writes to the first storage device;

forming at least one group of data writes having time stamp values earlier in time than the user specified cut-off time value, wherein the steps of obtaining the information and forming groups of data writes are performed multiple times to form multiple groups of data writes having time stamp values earlier in time than the user specified cut-off time value;

forming a group of data writes having time stamp values later in time than the user specified cut-off time value;

transferring the data writes in the groups having time stamp values earlier in time than the user specified cut-off time value to the second storage device for storage therein;

suspending for a time period transfers of data writes to the user specified volumes in the second storage device after forming the group of data writes having time stamp values later in time than the user specified cut-off time value and after transferring data writes from the groups having time stamp values earlier in time than the user specified cut-off time value to the second storage device; and performing analysis of data in the second storage device during the time period.

2. A method for maintaining the consistency of data across storage devices, comprising:

receiving a user specified cut-off time value in a command to ensure that data is consistent as of the user specified cut-off time obtaining information on data writes to a plurality of primary storage devices by a plurality of controllers, including information on time stamp values associated with the data writes indicating an order of the data writes to the at least one primary storage device;

forming at least one group of data writes having time stamp values earlier in time than the user specified cut-off time value by:

(i) determining a maximum time stamp value for the data writes to the plurality of controllers;

(ii) determining a minimum value of the maximum time stamp values;

(iii) forming a first group including data writes to the plurality of controllers having time stamp values earlier in time than the minimum value after determining that the minimum value is earlier in time than the user specified cut-off time value; and (iv) forming a second group including data writes to the plurality of controllers having time stamp values earlier in time than the minimum value and a third group including data writes having time stamp values later in time than the user specified cut-off time after determining that the minimum value is later in time than the user specified cut-off time value; and transferring the data writes in the groups to a secondary storage device for storage therein.

3. A method for maintaining the consistency of data across storage devices, comprising:

receiving a user specified cut-off time value in a command to ensure that data is consistent as of the user specified cut-off time;

obtaining information on data writes to a first storage device, including information on time stamp values associated with the data writes indicating an order of the data writes to the first storage device;

forming at least one group of data writes having time stamp values earlier in time than the user specified cut-off time value, wherein the steps of obtaining the information and forming groups of data writes are performed multiple times until the time stamp value is determined to be at or later in time than the user specified cut-off time value;

calculating a time stamp value by adding a predetermined time value to the time stamp value of a previously formed group of data writes after determining that there were no data writes to the first storage device since a previous instance of obtaining information; and transferring the data writes in the groups to a second storage device for storage therein.

4. The method of claim 3, wherein the predetermined time value represents a time interval between instances of obtaining information on data writes.

5. The method of claim 3, wherein data transfers to volumes in the second storage device are suspended after determining that the calculated time is later in time than the cut-off time value.

6. A system for maintaining the consistency of data across storage devices, comprising:

a processing unit;

a first storage device;

a second storage device;

a memory area for storing at least one data structure for access by program logic being executed by the processing unit, including:

(i) a user specified cut-off time value, received in a command to ensure that data is consistent as of the user specified cut-off time;

(ii) information on a group of data writes to the first storage device, including information on time stamp values associated with the data writes indicating an order of the data writes to the first storage device, wherein the time stamp values of the data writes in the group are earlier in time than the user specified cut-off time value, and wherein the data-writes-in the-group are transferred to the second storage device for storage therein;

(iii) information on at least one user specified volume pair to which the user specified cut-off time applies received in the command, wherein a volume pair comprises a volume in the second storage device and a corresponding volume in the first, storage device, wherein the volume in the second storage device includes a copy of data in the corresponding volume in the first storage device; and (iv) information on a group of data writes having time stamp values later in time than the user specified cut-off time value;

means for suspending for a time period transfers of data writes to the user specified volumes in the second storage device after forming the group of data writes having time stamp values later in time than the user specified cut-off time value and after transferring data writes from the groups having time stamp values earlier in time than the user specified cut-off time value to the second storage device; and means for performing analysis of data in the second storage device during the time period.

7. The system of claim 6, wherein the memory area is included within the second storage device.

8. The system of claim 6, wherein the host system is in a first location, wherein the first processing unit and first storage device are in a second location, wherein the second storage device is in a third location, wherein the first, second, and third locations are in separate geographical locations, further including:

a first long distance communication line providing communication between the host system and the first processing unit; and a second long distance communication line providing communication between the host system and the second storage device.

9. A system for maintaining the consistency of data across storage devices, comprising:

a host system including a processing unit;

a plurality of primary storage devices;

a secondary storage device;

a plurality of controllers controlling access to the primary storage devices, wherein the host system queries the plurality of controllers to obtain information on the data writes to the primary os storage devices, and wherein the host system transfers data writes to the secondary storage device by reading the data writes from the plurality of controllers and transferring the data writes to the secondary storage;

a memory area for storing at least one data structure for access by program logic being executed by the processing unit, including:

(i) a user specified cut-off time value, received in a command to ensure that data is consistent as of the user specified cut-off time;

(ii) information on a group of data writes to the primary storage devices, including information on time stamp values associated with the data writes indicating an order of the data writes to the primary storage devices, wherein the time stamp values of the data writes in the group are earlier in time than the user specified cut-off time value, and wherein the data writes in the group are transferred to the secondary storage device for storage therein, (iii) data indicating a maximum time stamp value for data writes to the plurality of controllers;

(iv) data indicating a minimum value of the maximum time stamp values;

(v) data indicating a first group of data writes to the plurality of controllers having time stamp values earlier in time than the minimum value after determining that the minimum value is earlier in time than the user specified cut-off time value; and (vi) data indicating a second group including data writes to the plurality of controllers having time stamp values earlier in time than the minimum value and data indicating a third group including data writes having time stamp values later in time than the user specified cut-off time after determining that the minimum value is later in time than the user specified cut-off time value.

10. A system for maintaining the consistency of data across storage devices, comprising:

a host system including a processing unit;

a first storage device;

a second storage device;

a first controller, wherein the first controller controls access to the first storage device, wherein the host system queries the first controller to obtain information on the data writes to the first storage device, and wherein the host system transfers data writes to the second storage device by reading the data writes from the first controller and transferring the data writes to the second storage device;

a memory area for storing at least one data structure for access by program logic being executed by the processing unit, including:

(i) a user specified cut-off time value, received in a command to ensure that data is consistent as of the user specified cut-off time;

(ii) information on a group of data writes to a first storage device, including information on time stamp values associated with the data writes indicating an order of the data writes to the first storage device, wherein the time stamp values of the data writes in the group are earlier in time than the cut-off time value, and wherein the data writes in the group are transferred to a second storage device for storage therein;

(iii) data indicating a calculated time stamp determined the program logic adding a predetermined time value to the time stamp value of a previously formed group of data writes after determining that there were no data writes to the first storage device since a previous instance of obtaining information.

11. An article of manufacture for use in programming a processing unit to transfer data between a first storage device and a second storage device, the article of manufacture comprising at least one computer readable storage device including at least one computer program embedded therein that causes the processing unit to perform:

receiving a user specified cut-off time value in a command to ensure that data is consistent as of the user specified cut-off time receiving at least one user specified volume pair to which the user specified cut-off time applies, wherein a volume pair comprises a volume in the first storage device and a corresponding volume in the second storage device, wherein the volume in the second storage device includes a copy of data in the corresponding volume in the first storage device;

obtaining information on data writes to the first storage device, including information on time stamp values associated with the data writes indicating an order of the data writes to the first storage device;

forming at least one group of data writes having time stamp values earlier in time than the user specified cut-off time value, wherein the steps of obtaining the information and forming groups of data writes are performed multiple times to form multiple groups of data writes having time stamp values earlier in time than the user specified cut-off time value;

forming a group of data writes having time stamp values later in time than the user specified cut-off time value;

transferring the data writes in the groups having time stamp values earlier in time than the user specified cut-off time value to the second storage device for storage therein;

suspending for a time period transfers of data writes to the user specified volumes in the second storage device after forming the group of data writes having time stamp values later in time than the user specified cut-off time value and after transferring data writes from the groups having time stamp values earlier in time than the user specified cut-off time value to the second storage device; and performing analysis of data in the second storage device during the time period.

12. An article of manufacture for use in programming a processing unit to transfer data writes from a plurality of controllers directed toward primary storage devices to a secondary storage device, wherein data writes are made to a plurality of controllers, the article of manufacture comprising at least one computer readable storage device including at least one computer program embedded therein that causes the processing unit to perform:

receiving a user specified cut-off time value in a command to ensure that data is consistent as of the user specified cut-off time;

obtaining information on data writes to the plurality of controllers, including information on time stamp values associated with the data writes indicating an order of the data writes to the primary storage devices;

forming at least one group of data writes having time stamp values earlier in time than the user specified cut-off time value by:

(i) determining a maximum time stamp value for the data writes to the plurality of controllers;

(ii) determining a minimum value of the maximum time stamp values;

(iii) forming a first group including data writes to the plurality of controllers having time stamp values earlier in time than the minimum value after determining that the minimum value is earlier in time than the user specified cut-off time value; and (iv) forming a second group including data writes to the plurality of controllers having time stamp values earlier in time than the minimum value and a third group including data writes having time stamp values later in time than the user specified cutoff time after determining that the minimum value is later in time than the user specified cut-off time value;

transferring the data writes in the groups to the secondary storage device for storage therein.

13. An article of manufacture for use in programming a processing unit to transfer data between a first storage device and a second storage device, the article of manufacture comprising at least one computer readable storage device including at least one computer program embedded therein that causes the processing unit to perform:

receiving a user specified cut-off time value in a command to ensure that data is consistent as of the user specified cut-off time;

obtaining information on data writes to the first storage device, including information on time stamp values associated with the data writes indicating an order of the data writes to the first storage device, wherein the steps of obtaining the information and forming groups of data writes are performed multiple times until the time stamp value is determined to be at or later in time than the user specified cut-off time value, forming at least one group of data writes having time stamp values earlier in time than the user specified cut-off time value;

transferring the data writes in the groups to the second storage device for storage therein; and calculating a time stamp value by adding a predetermined time value to the time stamp value of a previously formed group of data writes after determining that there were no data writes to the first storage device since a previous instance of obtaining information.

14. The article of manufacture of claim 13, wherein the predetermined time value represents a time interval between instances of obtaining information on data writes.

15. The article of manufacture of claim 13, wherein data transfers to volumes in the second storage device are suspended after determining that the calculated time is later in time than the cut-off time value.

* * * * *

UNITED STATES PATENT AND TRADEMARK OFFICE

CERTIFICATE OF CORRECTION

PATENT NO. : 6,301,643 B1

DATED : October 9, 2001
INVENTOR(S) : Robert Nelson Crockett, Ronald Maynard Kern and Gregory Edward McBride It is certified that error appears in the above-identified patent and that said Letters Patent is hereby corrected as shown below:

Title page,
Item [54], change title to read -- SYSTEM, METHOD, AND PROGRAM FOR PROVIDING DATA CONSISTENCY FOR A USER SPECIFIED CUT-OFF TIME --

Column 10,
Lines 22-23, delete the hyphens in "data-writes-in-the-group"
Line 29, delete the comma after "first"

Column 11,
Line 28, there should be no new paragraph after "determining that the"

Signed and Sealed this

Sixth Day of July, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,301,643 B1 
DATED : October 9, 2001
INVENTOR(S) : Robert Nelson Crockett et al.

It is certified that error appears in the above-identified patent and that said Letters Patent is hereby corrected as shown below:

<u>Column 11,</u>
Line 2, please delete "primary os storage devices" and insert therefore -- primary storage devices --

Signed and Sealed this

Tenth Day of August, 2004

JON W. DUDAS
*Acting Director of the United States Patent and Trademark Office*